United States Patent [19]

Okuno et al.

[11] Patent Number: 4,986,854

[45] Date of Patent: Jan. 22, 1991

[54] METHOD OF IMPROVING QUALITY OF MORTAR OR CONCRETE STRUCTURES AND ADDITIVES THEREFOR

[75] Inventors: Masahiko Okuno, Kobe; Yoshitaka Kanayama, Moriguchi, both of Japan

[73] Assignee: Merbabu Corporation, Osaka, Japan

[21] Appl. No.: 400,807

[22] Filed: Aug. 30, 1989

[30] Foreign Application Priority Data

Sep. 5, 1988 [JP] Japan ............................... 63-222148
May 31, 1989 [JP] Japan ............................... 1-139486

[51] Int. Cl.$^5$ ............................................ C04B 26/18
[52] U.S. Cl. ..................................... 106/665; 106/664; 106/707; 106/728; 106/808; 106/810
[58] Field of Search ............................. 106/94, 95, 96

[56] References Cited

U.S. PATENT DOCUMENTS

| | | | |
|---|---|---|---|
| 3,008,843 | 11/1961 | Jolly | 106/90 |
| 3,720,529 | 3/1973 | Jordan | 106/90 |
| 3,827,992 | 8/1974 | Aignesberger | 260/21 |
| 4,126,470 | 11/1978 | Braun et al. | 106/95 |

Primary Examiner—William R. Dixon, Jr.
Assistant Examiner—Chris Gallo
Attorney, Agent, or Firm—Larson and Taylor

[57] ABSTRACT

Disclosed is a method of improving the quality of a structure to be prepared from mortar or concrete, the method being characterized in that when the mortar or concrete is kneaded, a water-soluble amino resin is admixed therewith, or a water soluble amino resin and at least one of a higher fatty acid metal salt and a nonionic surfactant are admixed therewith.

11 Claims, No Drawings

METHOD OF IMPROVING QUALITY OF MORTAR OR CONCRETE STRUCTURES AND ADDITIVES THEREFOR

The present invention relates to a method of improving the quality of mortar or concrete building or civil engineering structures and to additives for mortar or concrete for use in this method. More particularly, the invention relates to a method of giving improved durability to mortar or concrete structures by preventing efflorescence of mortar or concrete secondary products, inhibiting neutralization of mortar or concrete structures, reducing drying shrinkage of mortar or concrete and inhibiting corrosion of reinforcements.

Mortar, concrete and like cement mixtures generally exhibit various fatal drawbacks when hardened and dried. For example, hardened cement mixtures effloresce over the surface, impairing the appearance of buildings and producing other adverse effects such as separation or discoloration of tiles, coatings or like finishing materials. Although various methods of preventing efflorescence have heretofore been proposed, fully effective methods of preventing efflorescence still remain to be developed. Difficulties thus encountered in preventing efflorescence are attributable, for example, to the fact that efflorescence occurs usually owing to two causes. As disclosed in Unexamined Japanese Patent Publication SHO 60-16843, one of the causes is that the calcium hydroxide present in the hardened body of cement mixture becomes carbonated on the surface of the body to grow into calcium carbonate crystals. The other cause is that an alkali metal and sulfate radical dissolve out to the surface of the hardened body to form crystals of alkali metal sulfate. Accordingly, agents for effectively preventing efflorescence due to one of the causes are not always capable of preventing efflorescence due to the other cause, consequently failing to completely prevent efflorescence.

Next, the durability of concrete structures will be considered. It is usuallly thought that reinforced concrete structures such as building floors, walls, roofs, columns and the like, bridges, etc. have a life of about 50 to about 60 years for the following reason. Neutralization due to carbon dioxide proceeds from the surface of concrete to the interior, and when the neutralization region develops to the position of the reinforcement, the reinforcement becomes corroded, permitting the reinforced concrete member to lose its durability.

Cement mixtures diminish in volume when hardened and dried. This drying shrinkage entails cracking of concrete structures Cracks lower the strength of the concrete structure and allow carbon dioxide to penetrate therethrough into the structure to cause accelerated neutralization of concrete and corrosion of the reinforcement, consequently greatly impairing the durability of the structure.

Such neutralization and cracking have heretofore been prevented, for example, by:
1) decreasing the water/cement ratio of the cement mixture, and
2) applying finishing materials, such as coating compositions, having high airtightness to the surface of concrete.

However, decreased water/cement ratios result in seriously impaired workability and entail the drawback that an increased amount of heat evolved during hardening cause cracking. Although the coating composition or like finishing material used is effective for a short period of time, the durability of the finishing material itself does not last long. Accordingly, neither of these methods 1) and 2) are not satisfactory.

The causes of impaired durability of concrete structures further include corrosion of the reinforcement in concrete due to iron corroding chlorides, more specifically due to the use of sea sand which is placed into use in increasing quantities in recent years and also due to the penetration into concrete of iron corroding chlorides which are entrained in the wind blowing from the sea/against concrete structures on the sea shore. Although agents have been proposed for accelerating initial hardening or giving enhanced waterproof property to inhibit corrosion, these agents are not always satisfactory. Especially no suitable corrosion inhibitor is available for use with sand aggregate containing not less than 0.01 wt.% of iron corroding chlorides calculated as NaCl.

The main object of the present invention is to remedy the foregoing inherent drawbacks of mortar or concrete building or civil engineering structures and to provide a method of giving mortar or concrete structures having high resistance to efflorescence and high durability.

We have conducted intensive research to solve the foregoing problems and consequently found that a water-soluble amino resin is effective for preventing efflorescence due to the foregoing two causes and also for inhibiting neutralization and corrosion of reinforcements.

We have further found that when the water-soluble amino resin and at least one of a higher fatty acid metal salt and/or a nonionic surfactant are used in combination in suitable amounts, the above effects of the amino resin can be enhanced with drying shrinkage also inhibited. The present invention has been accomplished based on these novel findings.

More specifically, the present invention provides a method of improving the quality of a structure to be prepared from mortar or concrete, the method being characterized in that when the mortar or concrete is kneaded, a water-soluble amino resin is admixed therewith.

The invention further provides a method of improving the quality of a structure to be prepared from mortar or concrete, the method being characterized in that when the mortar or concrete is kneaded, a water-soluble amino resin and at least one of a higher fatty acid metal salt and a nonionic surfactant are admixed therewith.

According to the invention, the water-soluble amino resin, when used singly, is effective for preventing efflorescence and inhibiting neutralization and corrosion of reinforcements.

Further according to the invention, these effects can be enhanced by using the water-soluble amino resin and at least one of a higher fatty acid metal salt and a nonionic surfactant in combination in suitable amounts.

More specifically, the water-soluble amino resin and the higher fatty acid metal salt, when used in combination, produce an increased effect to prevent efflorescence and an enhanced effect to inhibit neutralization.

The water-soluble amino resin and the nonionic surfactant, when used in combination, exhibits increased effects to prevent efflorescence and inhibit neutralization and drying shrinkage. When these materials are used in specific amounts, remarkably improved results can be achieved in all of the efflorescence preventing effect, the neutralization inhibiting effect, the drying shrinkage inhibiting effect and the corrosion inhibitory effect on reinforcements.

The use of the three materials, i.e. the water-soluble amino resin, the higher fatty acid metal salt and the nonionic surfactant, at least partly increases all of the effects to prevent efflorescence and inhibit neutralization, drying shrinkage and corrosion of reinforcements. When these three materials are used in specific amounts, remarkably improved results can be achieved in all of the effects to prevent efflorescence and inhibit neutralization, drying shrinkage and corrosion of reinforcements.

The water-soluble amino resin to be used in the invention is a water-soluble amino resin in a prepolymer stage primarily comprising a dimer or trimer and obtained by subjecting at least one of amino compounds or amide compounds such as melamine and urea and an aldehyde such as formaldehyde to methylolation and condensation. A wide variety of such resins are usable insofar as they are soluble in water. Especially desirable are those having a free methylol group. The amino resins which are insoluble in water, for example, owing to the presence of an etherified methylol group are unable to fully exhibit the desired effect to give an improved quality. Among the useful water-soluble amino resins, urea resin, melamine resin, urea-melamine resin and the like which are soluble in water and which have an average molecular weight of about 100 to about 1000 are preferable to use in the present invention. It is desired that the above urea resin be a water-soluble resin prepared from urea and about 1 to about 2.5 moles, preferably about 1.5 to about 2 moles, of formaldehyde per mole of urea, and that the above melamine resin be a water-soluble resin prepared from melamine and about 1.5 to about 3.5 moles, preferably about 2 to about 3 moles, of formaldehyde per mole of melamine, these resins being prepared by subjecting the starting materials to methylolation and condensation reactions. The above urea-melamine resin is preferably a mixture of these specific urea resin and melamine resin, or co-condensation product of urea, melamine and formaldehyde. These resins may be prepared for use in the invention, or commercial products are usable. The water-soluble amino resins are generally available in the form of an aqueous solution.

When to be used singly according to the invention, the water-soluble amino resin is used in an amount, calculated as dry solids, of about 0.4 to about 1.5 parts by weight, preferably about 0.5 to about 1.0 part by weight, per 100 parts by weight of cement. If the amount is less than 0.4 part by weight, the resin fails to produce the desired effect fully, whereas if it is more than 1.5 parts by weight, the mortar or cement will not always be hardened as desired, while the resin tends to exhibit a lower effect to inhibit corrosion of reinforcements.

As already stated, the water-soluble amino resin exhibits an enhanced effect when used in combination with at least one of a higher fatty acid metal salt and a nonionic surfactant.

While various higher fatty acid metal salts are usable, it is desirable to use alkali metal salts or alkaline earth metal salts of higher saturated or unsaturated monocarboxylic acids having 6 to 24 carbon atoms. Especially, alkaline earth metal salts of higher saturated monocarboxylic acids with 9 to 21 carbon atoms are inexpensive and are more desirable also from the viewpoint of an alkali-aggregate reaction. Among the higher fatty acid metal salts useful for the present invention, especially desirable to use are calcium stearate, magnesium stearate, calcium myristate, calcium palmitate, calcium laurate and the like.

Although various nonionic surfactants are usable, typical of preferred surfactants are those represented by the formula $$RO(CH_2CH_2O)_nH \quad (1), \text{ or}$$

$$RO(CH_2CH_2O)_nR \quad (2)$$

wherein R is alkyl having 6 to 22 carbon atoms or phenyl substituted or unsubstituted with a halogen atom or with alkyl having 1 to 16 carbon atoms, and n is an integer of 4 to 30, surfactants represented by the formula $$R^1COO(CH_2CH_2O)_mH \quad (3), \text{ or}$$

$$R^1COO(CH_2CH_2O)_mCOR^1 \quad (4)$$

wherein $R^1$ is alkyl having 6 to 22 carbon atoms, and m is an integer of 4 to 30, and surfactants represented by the formula $$R^2CONCH_2CH_2OH \atop R^3 \quad (5)$$

wherein $R^2$ is alkyl having 6 to 22 carbon atoms, and $R^3$ is a hydrogen atom or 2-hydroxyethyl.

The higher fatty acid metal salt or the nonionic surfactant, if used singly, exhibits none of the effects to prevent efflorescence and effects to inhibit neutralization, drying shrinkage and corrosion of reinforcements. However, when used in combination with the water-soluble amino resin, the salt and/or surfactant can enhance the effect of the amino resin to prevent efflorescence, inhibit neutralization and diminish drying shrinkage. Accordingly, when to be used in such a combination, the water-soluble amino resin can be used in a smaller amount than when it is used singly, and generally used in an amount, calculated as dry solids, of about 0.2 to about 1.5 parts by weight, preferably about 0.3 to about 1.0 part by weight, per 100 parts by weight of cement. The higher fatty acid metal salt, when employed in combination with the water-soluble amino resin, is used usually in an amount of about 0.02 to about 0.1 part by weight, preferably about 0.03 to about 0.08 part by weight, per 100 parts by weight of cement. The nonionic surfactant, when employed in combination with the amino resin, is used generally in an amount of about 0.004 to about 0.08 part by weight, preferably about 0.005 to about 0.05 part by weight, per 100 parts by weight of cement.

When 0.2 to 1.5 parts by weight of the water-soluble amino resin (calculated as dry solids) and about 0.02 to about 0.1 part by weight of the higher fatty acid metal salt are used in combination per 100 parts by weight of cement, the amino resin exhibits enhanced effects to prevent efflorescence and inhibit neutralization. The higher fatty acid metal salt, if used in an amount less than 0.02 part by weight, produces a diminished effect to enhance the efflorescence preventing effect and the neutralization inhibiting effect, whereas if the amount exceeds 0.1 part by weight, efflorescence is conversely more likely to occur.

When about 0.2 to about 1.5 parts by weight of the water-soluble amino resin (calculated as dry solids) and about 0.004 to about 0.08 part by weight of the nonionic surfactant are used in combination per 100 parts by weight of cement, increased effects can be achieved in preventing efflorescence and inhibiting neutralization and drying shrinkage. If the amount of the nonionic surfactant is less than 0.004 part by weight, a diminished effect will result in enhancing the neutralization inhibiting effect and drying shrinkage inhibiting effect, whereas if the amount is more than 0.08 part by weight, there occurs a tendency to reduce the effect to enhance the efflorescence preventing effect and the neutralization inhibiting effect.

When about 0.2 to about 1.5 parts by weight of the water-soluble amino resin (calculated as dry solids), about 0.02 to about 0.1 part by weight of the higher fatty acid metal salt and about 0.004 to about 0.08 part by weight of the nonionic surfactant are used in combination per 100 parts by weight of cement, the combination of these additives at least partly increases all the effects to prevent efflorescence and inhibit neutralization, drying shrinkage and corrosion of reinforcements.

Remarkably improved results can be achieved in respect of all of these effects by using about 0.3 to about 1.0 part by weight of the water-soluble amino resin (calculated as dry solids) and about 0.005 to about 0.03 part by weight of the nonionic surfactant per 100 parts by weight of cement, or by using about 033 to about 1.0 part by weight of the water-soluble amino resin (calculated as dry solids), about 0.03 to about 0.1 part by weight of the higher fatty acid metal salt and about 0.005 to about 0.03 part by weight of the nonionic surfactant per 100 parts by weight of cement.

The present invention described above achieves improvements in the effect to prevent efflorescence and inhibit neutralization, drying shrinkage and corrosion of reinforcements and further gives improved waterproof property to mortar and concrete structures.

The cement to be used in the method of the invention can be any of those generally used and including, for example, ordinary portland cement, high alumina cement, portland fly-ash cement, portland blast-furnace slag cement, portland pozzolan cement and the like.

In the case where the water-soluble amino resin and at least one of the higher fatty acid metal salt and the nonionic surfactant are to be used in combination, these additives may be individually admixed with a cement mixture (i.e. mix), or may be mixed together first to obtain a composition in conformity with the contemplated quality before being admixed with the cement mixture. The composition can be prepared suitably with reference to the amounts of additives specified above for use. It is generally desirable that the composition comprise about 5 to about 25 parts by weight, preferably about 7.5 to about 20 parts by weight, of the higher fatty acid metal salt and/or about 1 to about 20 parts by weight, preferably about 1.5 to about 7.5 parts by weight, of the nonionic surfactant, per 100 parts by weight of the water-soluble amino resin (calculated as dry solids).

Accordingly, the present invention provides an additive composition for mortar or concrete which composition is characterized in that it comprises:

(a) 100 parts by weight of a water-soluble amino resin (calculated as dry solids), and (b) 5 to 25 parts by weight of a higher fatty acid metal salt and/or 1 to 20 parts by weight of a nonionic surfactant.

According to the present invention, mortar or concrete structures such as building walls or floors, or bridges are prepared by admixing the water-soluble amino resin singly with mortar, concrete or like cement mixture, or admixing the water-soluble amino resin and at least one of the higher fatty acid metal salt and the nonionic surfactant with such a cement mixture to obtain a uniform mixture, pouring the resulting mixture into a formwork and hardening the mixture. The structure obtained has an improved quality as described above. Alternatively, the uniform mixture is applied by coating or spraying to the surfaces of mortar or concrete structures already completed, whereby efflorescence and neutralization can be prevented or inhibited.

The present invention will be described in greater detail with reference to the following examples and comparative examples.

EXAMPLE 1

(1) Additives

The following water-soluble amino resins were used in the present example.

a: Water-soluble urea resin

Prepolymer included in "EGETARIME" series (brand name for products of Sumitomo Bakelite Co., Ltd.) and prepared by subjecting urea and 1.7 moles of formaldehyde per mole of urea to methylolation and condensation reactions (average molecular weight =about 300).

b: Water-soluble melamine resin

Prepolymer included in "EGETARIME" series (brand name for products of Sumitomo Bakelite Co., Ltd.) and prepared by subjecting melamine and 2.6 moles of formaldehyde per mole of melamine to methylolation and condensation reactions (average molecular weight =about 500).

c: Water-soluble urea-melamine resin

Mixture of the water-soluble urea resin a and the water-soluble melamine resin b in the weight ratio of 3:7.

The following compounds were used as higher fatty acid metal salts.

I: Calcium stearate

II: Calcium palmitate

The following compounds were used as nonionic surfactants.

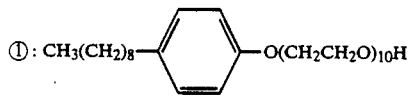

② : $CH_3(CH_2)_{16}COO(CH_2CH_2O)_8H$

③ : $CH_3(CH_2)_8CONHCH_2CH_2OH$ (2) Test methods (1) Accelerated efflorescence test The water-soluble amino resin, and the higher fatty acid metal salt and/or the nonionic surfactant were admixed in quantities given in Table 1 with ordinary portland cement to prepare a mortar having a sand/cement ratio by weight of 3 (using standard sand in Toyoura) and a water/cement ratio by weight of 0.7. The mortar was molded into a prism, 10×10×10 cm, cured in humid air at 20° C. and 90% RH for 24 hours and then removed from the form. Similarly various mortar prisms were prepared by using the specified additives in varying quantities as listed in Table 1.

Each of the mortar prisms was sliced at a spacing of 2 cm to obtain cut pieces, 10×10×2 cm. The cut pieces were dried at 80° C. for 24 hours and coated with paraffin over four side faces of each to obtain test pieces for efflorescence test.

An aqueous solution containing 2 wt.% of sodium sulfate and an excess of calcium hydroxide was placed into a container, and oil was caused to float over the liquid surface to prevent carbonation. The above test pieces were immersed in the bath to a depth of 1 cm while maintaining the bath in an environment of 7° C. and 55% RH with an air flow rate of 0.2 to 0.3 m/sec, and were checked for efflorescence with the unaided eye 14 days later. The degree of resulting efflorescence was determined according to the following criteria.

⊚ : Free from any efflorescence
○ : Slight whitish discoloration at the periphery or center of the test piece
Δ: Efflorescence at the periphery of the test piece
X : Efflorescence over the entire test piece Table 1 shows the results.

2) Accelerated neutralization test

The same additives as used in the test 1) were admixed in similarly varying ratios with ordinary portland cement to prepare mixes having a river sand/cement ratio by weight of 1, a gravel/river sand ratio by weight of 1.5 and a water/cement ratio by weight of 0.6. The mixes were molded into rectangular parallelepipedal test pieces, 10 cm ×10 cm ×20 cm, cured at 20° C. and 90% RH for 1 week and then dried at 20° C. and 50% RH for 2 weeks. The test pieces obtained were allowed to stand in a chamber at 40° C., 50% RH and carbon dioxide concentration of 10% for 1 month.

Each of the test pieces was then withdrawn from the chamber and cut, 1% phenolphthalein solution (ethyl alcohol) was sprayed on the cut surface, and the depth of neutralization (depth of colorless portion) was measured.

Table 1 shows the measurements obtained.

3) Drying shrinkage test

The same additives as used in the test 1) were admixed in similarly varying ratios with ordinary portland cement to prepare mixes having a river sand/cement ratio by weight of 1, a gravel/river sand ratio by weight of 1 and a water/cement ratio by weight of 0.6. The mixes were then tested according to JIS A 1129, "Method of Testing Mortar and Concrete for Variations in Length."

The drying shrinkage of the mix was determined after lapse of 3 months.

Table 1 shows the test results.

4) Accelerated corrosion test

The same additives as used in the test 1) were admixed in similarly varying ratios with 50 parts by weight of ordinary portland cement, and each of the mixtures was mixed with 100 parts by weight of sea sand (containing 0.2 wt.% of chlorides calculated as NaCl) and further kneaded with water to obtain a mix having a water/cement ratio by weight of 0.5. A mild steel rod (4 mm in diameter and 100 mm in length) thoroughly polished and degreased with acetone was placed into a form centrally thereof, and the mix was poured into the form to mold a rectangular parallelepipedal concrete test piece, 4×4×160 mm.

The test piece was cured at 20° C. and 60% RH for 1 week and allowed to stand in a constant-temperature constant-humidity chamber at 40° C. and 90% RH for 3 months. The test piece was thereafter broken, and the reinforcement (i.e., above mild steel rod) was checked for corrosion with the unaided eye.

The degree of resulting corrosion of the reinforcement was determined according to the following criteria.

⊚ : Free from any corrosion
○ : Almost free from corrosion
Δ: Slight corrosion
X : Considerable corrosion Table 1 shows the results.

In Table 1 and also in the following tables, the "amount" is expressed in parts by weight per 100 parts by weight of the cement. The amount of water-soluble amino acid is given in an amount calculated as dry solids.

COMPARATIVE EXAMPLE 1

The foregoing tests 1) to 4) were conducted in the same manner as in Example 1 except that the water-soluble amino resin was replaced by one of the water-insoluble amino resins x and y (described below) having a butyletherified terminal methylol group, as listed in Table 2 (samples No.43 to No.45).

Table 2 shows the results.

x: Water-insoluble urea resin
    Water-soluble urea resin a used in Example 1, as butyletherified.
y: Water-insoluble melamine resin
    Water-soluble melamine resin b used in Example 1, as butyletherified.

COMPARATIVE EXAMPLE 2

The foregoing tests 1) to 4) were conducted in the same manner as in Example 1 with the exception of using the higher fatty acid metal salt singly (samples No.46 and No.47) or using the nonionic surfactant singly (samples No.48 to No.50). Table 2 shows the results.

Table 2 also shows the results achieved using a cement mix free from any additive (plain).

TABLE 1

| Sample No. | Water-soluble amino resin Kind | Water-soluble amino resin Amount | Higher fatty acid metal salt Kind | Higher fatty acid metal salt Amount | Nonionic surfactant Kind | Nonionic surfactant Amount | Efflorescence | Depth of neutralization (mm) | Drying shrinkage (× 10$^{-4}$) | Corrosion |
|---|---|---|---|---|---|---|---|---|---|---|
| 1 | a | 0.30 | — | — | — | — | Δ | 4.2 | 12.4 | ○ |
| 2 | a | 0.40 | — | — | — | — | ○ | 2.5 | 12.1 | ⊚ |
| 3 | a | 0.50 | — | — | — | — | ⊚ | 2.2 | 12.2 | ⊚ |
| 4 | a | 1.00 | — | — | — | — | ⊚ | 2.2 | 11.9 | ⊚ |
| 5 | a | 1.50 | — | — | — | — | ⊚ | 2.1 | 12.1 | ○ |
| 6 | b | 0.30 | — | — | — | — | Δ | 4.0 | 12.5 | Δ |
| 7 | b | 0.50 | — | — | — | — | ⊚ | 3.2 | 12.1 | ⊚ |
| 8 | b | 0.50 | — | — | — | — | ○ | 2.8 | 12.1 | ⊚ |

TABLE 1-continued

| Sample No. | Water-soluble amino resin Kind | Water-soluble amino resin Amount | Higher fatty acid metal salt Kind | Higher fatty acid metal salt Amount | Nonionic surfactant Kind | Nonionic surfactant Amount | Efflorescence | Depth of neutralization (mm) | Drying shrinkage (× 10⁻⁴) | Corrosion |
|---|---|---|---|---|---|---|---|---|---|---|
| 9 | b | 1.00 | — | — | — | — | ◎ | 2.5 | 11.9 | ◎ |
| 10 | b | 1.50 | — | — | — | — | ◎ | 2.6 | 11.8 | ○ |
| 11 | c | 0.50 | — | 0.03 | — | — | ○ | 2.8 | 12.1 | ◎ |
| 12 | a | 0.15 | I | 0.03 | — | — | △ | 4.5 | 12.4 | X |
| 13 | a | 0.20 | I | 0.03 | — | — | ◎ | 2.1 | 12.2 | △ |
| 14 | a | 0.30 | I | 0.03 | — | — | ◎ | 0.9 | 12.4 | ○ |
| 15 | a | 0.50 | I | 0.03 | — | — | ◎ | 0.7 | 12.2 | ◎ |
| 16 | a | 1.00 | I | 0.03 | — | — | ◎ | 0.7 | 12.0 | ◎ |
| 17 | a | 1.50 | I | 0.03 | — | — | ○ | 0.8 | 12.0 | ○ |
| 18 | b | 0.20 | I | 0.03 | — | — | ○ | 2.4 | 12.4 | △ |
| 19 | b | 0.50 | I | 0.03 | — | — | ○ | 1.1 | 12.1 | ◎ |
| 20 | b | 1.50 | I | 0.03 | — | — | ○ | 1.0 | 12.0 | ○ |
| 21 | a | 0.30 | Ii | 0.03 | — | — | ◎ | 0.8 | 12.2 | ○ |
| 22 | b | 0.30 | II | 0.03 | — | — | ○ | 1.6 | 12.4 | ○ |
| 23 | a | 0.30 | I | 0.01 | — | — | △ | 2.2 | 12.2 | ○ |
| 24 | a | 0.30 | I | 0.02 | — | — | ○ | 0.7 | 12.2 | ○ |
| 25 | a | 0.30 | I | 0.08 | — | — | ◎ | 0.7 | 12.1 | ◎ |
| 26 | a | 0.30 | I | 0.10 | — | — | ○ | 0.9 | 12.0 | ○ |
| 27 | a | 0.30 | I | 0.15 | — | — | △ | 0.8 | 12.2 | ◎ |
| 28 | a | 0.30 | — | — | ① | 0.003 | △ | 2.8 | 8.2 | ○ |
| 29 | a | 0.30 | — | — | ① | 0.005 | ○ | 0.8 | 7.1 | ○ |
| 30 | a | 0.30 | — | — | ① | 0.01 | ○ | 0.9 | 7.2 | ○ |
| 31 | a | 0.30 | — | — | ① | 0.02 | ○ | 1.1 | 8.1 | ○ |
| 32 | a | 0.30 | — | — | ① | 0.03 | ◎ | 1.4 | 8.2 | ○ |
| 33 | a | 0.30 | — | — | ① | 0.05 | ○ | 4.0 | 8.6 | ○ |
| 34 | a | 0.30 | — | — | ① | 0.08 | ○ | 4.8 | 11.4 | ○ |
| 35 | a | 0.30 | — | — | ② | 0.005 | ○ | 1.4 | 8.4 | ○ |
| 36 | a | 0.30 | — | — | ③ | 0.005 | ○ | 1.5 | 8.6 | ○ |
| 37 | a | 0.30 | I | 0.03 | ① | 0.005 | ◎ | 0.7 | 7.2 | ○ |
| 38 | a | 0.30 | I | 0.03 | ① | 0.01 | ◎ | 0.8 | 7.4 | ○ |
| 39 | a | 0.30 | I | 0.08 | ① | 0.005 | ◎ | 0.8 | 7.1 | ◎ |
| 40 | a | 0.30 | I | 0.08 | ① | 0.01 | ◎ | 0.7 | 7.3 | ◎ |
| 41 | a | 0.40 | — | — | ① | 0.005 | ◎ | 0.7 | 7.2 | ◎ |
| 42 | a | 0.40 | — | — | ① | 0.01 | ◎ | 0.8 | 7.5 | ◎ |

TABLE 2

| Sample No. | Water-soluble amino resin Kind | Water-soluble amino resin Amount | Higher fatty acid metal salt Kind | Higher fatty acid metal salt Amount | Nonionic surfactant Kind | Nonionic surfactant Amount | Efflorescence | Depth of neutralization (mm) | Drying shrinkage (× 10⁻⁴) | Corrosion |
|---|---|---|---|---|---|---|---|---|---|---|
| 43 | x | 0.50 | I | 0.03 | — | — | △ | 5.4 | 12.6 | △ |
| 44 | y | 0.50 | — | — | — | — | X | 5.8 | 12.2 | △ |
| 45 | y | 0.50 | I | 0.03 | — | — | △ | 5.3 | 12.1 | △ |
| 46 | — | — | I | 0.03 | — | — | X | 6.8 | 12.2 | X |
| 47 | — | — | II | 0.03 | — | — | X | 6.6 | 12.8 | X |
| 48 | — | — | — | — | ① | 0.03 | X | 8.9 | 12.5 | X |
| 49 | — | — | — | — | ② | 0.03 | X | 7.0 | 12.2 | X |
| 50 | — | — | — | — | ③ | 0.03 | X | 6.7 | 12.6 | X |
| 51 | Plain | | | | | | X | 6.5 | 12.4 | X |

Tables 1 and 2 show that the use of the water-soluble amino resin in a suitable amount prevents or inhibits efflorescence, neutralization and corrosion of the reinforcement, and that the use of the water-soluble amino resin and at least one of the higher fatty acid metal salt and the nonionic surfactant in suitable amounts effectively collectively prevents or inhibits efflorescence, neutralization, drying shrinkage and corrosion of the reinforcement.

EXAMPLE 2

The samples Nos.3, 14, 15 and 32 listed in Table 1 were tested for water absorption according to JIS A1401. Table 3 shows the results.

For comparison, Table 3 also shows the results achieved by sample No.1 of Table 1 and sample No.51 (plain) of Table 2.

TABLE 3

| Sample No. | Amount of amino resin | Amount of fatty acid metal salt or surfactant | Percent water absorption In 1 hr | Percent water absorption In 5 hrs | Percent water absorption In 24 hrs | Relative water absorption In 1 hr | Relative water absorption In 5 hrs | Relative water absorption In 24 hrs |
|---|---|---|---|---|---|---|---|---|
| 1 | 0.30 | — | 4.0 | 5.7 | 9.3 | 0.53 | 0.68 | 0.80 |
| 3 | 0.50 | — | 3.3 | 4.6 | 7.9 | 0.44 | 0.55 | 0.68 |
| 14 | 0.30 | 0.03 | 3.4 | 4.8 | 7.8 | 0.45 | 0.57 | 0.67 |
| 15 | 0.50 | 0.03 | 2.9 | 4.2 | 7.5 | 0.39 | 0.50 | 0.65 |
| 32 | 0.30 | 0.03 | 3.0 | 4.3 | 7.5 | 0.40 | 0.51 | 0.65 |

TABLE 3-continued

| Sample No. | Amount of amino resin | Amount of fatty acid metal salt or surfactant | Percent water absorption | | | Relative water absorption | | |
|---|---|---|---|---|---|---|---|---|
| | | | In 1 hr | In 5 hrs | In 24 hrs | In 1 hr | In 5 hrs | In 24 hrs |
| 51 | | Plain | 7.5 | 8.4 | 11.6 | 1.00 | 1.00 | 1.00 |

Table 3 shows that the use of the water-soluble amino resin (sample No.3) also affords waterproof property, and that the use of the water-soluble amino resin in combination with the higher fatty acid metal salt or nonionic surfactant (samples Nos.14, 15 and 32) gives further improved waterproof property.

We claim:

1. A method of improving the quality of a structure to be prepared from mortar or concrete, wherein the quality relates to prevention of efflorescence, inhibition of neutralization and corrosion of reinforcements, the method being characterized in that when the mortar or concrete is kneaded, a water-soluble amino resin selected from the group consisting of water-soluble urea resin, water-soluble melamine resin and water-soluble urea-melamine resin is admixed therewith wherein the water-soluble amino resin is used in an amount of about 0.4 to about 1.5 parts by weight calculated as dry solids per 100 parts by weight of cement.

2. A method of improving the quality of a structure to be prepared from mortar or concrete, wherein the quality relates to prevention of effluorescence, inhibition of neutralization, inhibition of drying shrinkage and inhibition of corrosion of reinforcements, the method being characterized in that when the mortar or concrete is kneaded, a water-soluble amino resin selected from the group consisting of water-soluble urea resin, water-soluble melamine resin and water-soluble urea-melamine resin, and at least one of a higher fatty acid metal salt and a nonionic surfactant are admixed therewith, wherein about 0.2 to about 1.5 parts by weight of the water-soluble amino resin (calculated as dry solids), and additionally about 0.02 to about 0.1 parts by weight of the higher fatty acid metal salt and/or about 0.004 to about 0.08 parts by weight of the nonionic surfactant are used per 100 parts by weight of cement.

3. A method as defined in claim 1 wherein the water-soluble amino resin is used in an amount of about 0.5 to about 1.0 part by weight calculated as dry solids per 100 parts by weight of cement.

4. A method as defined in claim 2 wherein the higher fatty acid metal salt is an alkali metal salt or alkaline earth metal salt of a higher saturated or unsaturated monocarboxylic acid having 6 to 24 carbon atoms.

5. A method as defined in claim 2 wherein the higher fatty acid metal salt is an alkaline earth metal salt of a higher saturated monocarboxylic acid having 9 to 21 carbon atoms.

6. A method as defined in claim 2 wherein the higher fatty acid metal salt is at least one compound selected from the group consisting of calcium stearate, magnesium stearate, calcium myristate, calcium palmitate and calcium laurate.

7. A method as defined in claim 2 wherein the nonoionic surfactant is at least one surfactant selected from among surfactants represented by the formula $$RO(CH_2CH_2O)_nH \qquad (1), or$$

$$RO(CH_2CH_2O)_nR \qquad (2)$$

wherein R is alkyl having 6 to 22 carbon atoms or phenyl substituted or unsubstituted with a halogen atom or with alkyl having 1 to 16 carbon atoms, and n is an integer of 4 to 30, surfactants represented by the formula $$R^1COO(CH_2CH_2O)_mH \qquad (3), or$$

$$R^1COO(CH_2CH_2O)_mCOR^1 \qquad (4)$$

wherein $R^1$ is alkyl having 6 to 22 carbon atoms, and m is an integer of 4 to 30, and surfactants represented by the formula $$R^2CONCH_2CH_2OH \atop | \atop R^3 \qquad (5)$$

wherein $R^2$ is alkyl having 6 to 22 carbon atoms, and $R^3$ is a hydrogen atom or 2-hydroxyethyl.

8. A method as defined in claim 2 wherein about 0.3 to about 1.0 part by weight of the water-soluble amino resin (calculated as dry solids), and additionally about 0.03 to about 0.08 part by weight of the higher fatty acid metal salt and/or about 0.005 to about 0.05 part by weight of the nonionic surfactant are used per 100 parts by weight of cement.

9. A method as defined in claim 2 wherein about 0.3 to about 1.0 part by weight of the water-soluble amino resin (calculated as dry solids) and about 0.005 to about 0.03 part by weight of the nonionic surfactant are used per 100 parts by weight of cement, or about 0.3 to about 1.0 part by weight of the water-soluble amino resin (calculated as dry solids), about 0.03 to about 0.1 part by weight of the higher fatty acid metal salt and about 0.005 to about 0.03 part by weight of the nonionic surfactant are used per 100 parts by weight of cement.

10. An additive composition for mortar or concrete for prevention of efflorescence, inhibition of neutralization, inhibition of drying shrinkage and inhibition of corrosion of reinforcements characterized in that the composition comprises (a) 100 parts by weight of a water-soluble amino resin selected from the group consisting of water-soluble urea resin, water-soluble melamine resin and water-soluble urea-melamine resin (calculated as dry solids), and (b) about 5 to about 25 parts by weight of a higher fatty acid metal salt and/or about 1 to about 20 parts by weight of a nonionic surfactant.

11. An additive composition for mortar or concrete as defined in claim 10 characterized in that the composition comprises:

(a) 100 parts by weight of a water-soluble amino resin (calculated as dry solids), and (b) about 7.5 to about 20 parts by weight of a higher fatty acid metal salt and/or about 1.5 to about 7.5 parts by weight of a nonionic surfactant.

* * * * *